United States Patent [19]

Yamada et al.

[11] Patent Number: 5,725,223
[45] Date of Patent: Mar. 10, 1998

[54] MANIFOLD GASKET WITH DIFFERENT SEALING BEADS

[75] Inventors: Kenji Yamada; Yoshio Miyaoh, both of Tokyo, Japan

[73] Assignee: Ishikawa Gasket Co., Ltd., Tokyo, Japan

[21] Appl. No.: 764,226

[22] Filed: Dec. 13, 1996

[51] Int. Cl.$^6$ ........................................ F16J 15/00
[52] U.S. Cl. ............................. 277/235 B; 277/207 R
[58] Field of Search ..................... 277/235 B, 180, 277/207 R, 236, 213

[56] References Cited

U.S. PATENT DOCUMENTS

| | | | |
|---|---|---|---|
| 4,915,398 | 4/1990 | Kitigawa | 277/235 B |
| 5,022,661 | 6/1991 | Nakasone | 277/235 B |
| 5,087,058 | 2/1992 | Miura et al. | 277/235 B |
| 5,310,196 | 5/1994 | Kawaguchi et al. | 277/235 B |
| 5,451,063 | 9/1995 | Udagawa et al. | 277/235 B |
| 5,536,024 | 7/1996 | Udagawa | 277/235 B |
| 5,544,900 | 8/1996 | Aoki | 277/235 B |

FOREIGN PATENT DOCUMENTS 0 440 247   8/1991   European Pat. Off.

*Primary Examiner*—Daniel G. DePumpo
*Attorney, Agent, or Firm*—Kanesaka & Takeuchi

[57] ABSTRACT

A manifold gasket of the invention is used for a manifold with at least three manifold holes arranged side by side. The gasket is basically formed of a metal plate for constituting the manifold gasket, which has two outer holes and at least one inner hole situated between the two outer holes. The metal plate includes two outer beads and at least one inner bead. Each outer bead surrounds each outer hole, and the inner bead surrounds the inner hole. Each outer bead forms a surface pressure less than that of the inner bead when the manifold gasket is compressed with a predetermined constant torque. Therefore, the outer bead has compressibility more than that of the inner bead to absorb deformation of the manifold when it is heated. The gasket can securely seal around the manifold holes.

7 Claims, 2 Drawing Sheets

MANIFOLD GASKET WITH DIFFERENT SEALING BEADS

BACKGROUND OF THE INVENTION AND RELATED ART STATEMENT

The present invention relates to a manifold gasket with different sealing beads, to be installed between a manifold and a cylinder head of an internal combustion engine.

In an internal combustion engine with a plurality of cylinder bores arranged side by side, a manifold with branch portions is attached to the cylinder head of the engine to exhaust a combustion gas from the engine. One typical manifold M is shown in FIGS. 1 and 2

As shown in FIG. 1, a manifold M is formed of a main portion 10 with an end 11, and branch portions 12 extending from the main portion 10. The branch portions 12 have flanges 13 fixed to the respective exhaust ports 14 of a cylinder head CH of the engine. The end 11 is arranged obliquely relative to the flanges 13 of the branch portions 12.

When the engine is operated, the manifold M is heated by the exhaust gas and deforms in the specific directions. Generally, outer branch portions 15 bend or tilt outwardly more than inner branch portions 16 (FIG. 1). Also, each flange 13 tilts relative to the end 11 of the main portion 10, wherein a force leaving from the cylinder head CH is stronger at a lower portion of the flange 13 than that at an upper portion thereof (FIG. 2) relative to the end 11.

Since the manifold tilts in different directions when the engine is operated, the manifold gasket receives various forces. In order to securely seal around the manifold holes, the gasket should not simply connect the manifold to the cylinder head. The gasket is required to absorb the force applied from the manifold due to heat deformation.

In U.S. Pat. No. 5,544,900, spacers are partly formed on a manifold gasket to prevent creep relaxation of outer beads, and inner beads without the spacers absorb deformation of the manifold. In view of the various forces applied onto the manifold, it is still required to improve the manifold gasket.

An object of the invention is to provide a manifold gasket, which can securely seal around exhaust ports of a cylinder head even if various deformation forces are applied to the gasket.

Another object of the invention is to provide a manifold gasket as stated above, which can absorb the various deformation forces applied from the manifold when it is heated.

A further object of the invention is to provide a manifold gasket as stated above, which can be easily made.

Further objects and advantages of the invention will be apparent from the following description of the invention.

SUMMARY OF THE INVENTION

A manifold gasket of the invention is designed for a manifold with at least three manifold holes arranged side by side. The manifold gasket is basically formed of one or a first metal plate for constituting the manifold gasket. The first metal plate has two outer holes and at least one inner hole situated between the two outer holes. The outer and inner holes correspond to the three manifold holes. A plurality of bolt holes is also formed for fixing the manifold gasket and the manifold.

In the manifold gasket of the invention, two outer beads and at least one inner bead are formed on the first metal plate. Each one outer bead surrounds each outer hole, and the inner bead surrounds one inner hole. The outer beads provide surface pressure less than that of the inner bead. Thus, when the manifold with the manifold gasket is fixed with a predetermined constant torque, the outer bead has compressibility more than that of the inner bead to absorb deformation of the manifold when it is heated and to securely seal around the manifold holes.

Each outer bead has two inclined flat side walls and a flat top wall between the side walls similar to a trapezoidal shape in cross section. Also, the inner bead is formed of curved side walls and a curved top wall between the curved side walls similar to an arch shape in cross section. The outer and inner beads have the same widths and form the different surface pressures when the gasket is tightened.

In regard to beads, as the width of the bead becomes wide, the bead can be compressed easily with less tightening pressure. Similarly, in case the widths of the beads are the same, a bead with a trapezoidal shape like the outer bead can be compressed easily more than a bead with an arch shape like the inner bead. In the invention, all bolts for the manifold are tightened with a predetermined torque by a torque wrench.

In the invention, the outer beads have trapezoidal shapes and the inner bead has an arch shape. In this case, since the beads are tightened with the same torque, when the outer and inner beads are tightened, the outer beads are not compressed so strongly than the inner bead. Namely, the surface pressure of the bead formed by the inner bead is stronger than that formed by the outer bead. In other words, the outer bead has a compressible capacity more than that of the inner bead. Since the outer branch of the manifold deforms more than the inner branch, the compressible capacity of the outer bead is used to absorb the deformation of the manifold. Therefore, the manifold gasket of the invention can securely seal around the manifold holes.

The outer and the inner beads may have the same widths throughout the entire lengths thereof. Also, in case each of the outer and inner beads is defined to have first and second sides facing to each other, the width at the first side may be formed greater than the width at the second side.

In particular, the manifold includes at least three branch portions having flanges to be fixed to the gasket, and a main portion connected to the branch portions and having an end arranged obliquely to the flanges. The flange has a close portion near the end and a far portion slightly away from the end. The first and second sides as explained above abut against the close portion and the far portion respectively. As a result, the inclination of the flange relative to the end can be properly absorbed by the manifold gasket of the invention.

In the manifold gasket of the invention, a second metal plate having a structure as in the first metal plate may be laminated on the first metal plate. The outer and inner beads on the first metal plate are disposed on the respective outer and inner beads on the second metal plate such that the outer and inner beads orient in opposite directions. Outer plates may be further laminated outside the first and second metal plates.

DETAILED DESCRIPTION OF PREFERRED EMBODIMENTS

With reference to FIGS. 1-5, a first embodiment G of a manifold gasket of the invention is explained.

Figure 1:
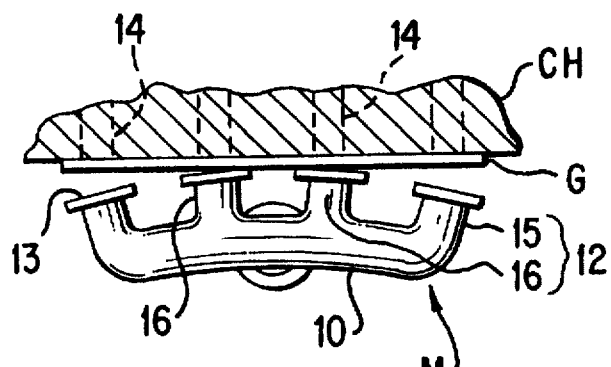
FIG. 1 is an explanatory plan view for showing a manifold, a manifold gasket and a cylinder head.

The manifold gasket G of the invention includes manifold holes 20, 20' and bolt holes 21 situated outside the respective manifold holes. As shown in FIG. 1, the manifold gasket G is situated between the manifold M and the cylinder head CH and is fixed by bolts (not shown).

The manifold gasket G is formed of an upper outer plate 22, inner plates 23, 24 and a lower outer plate 25. The inner plates 23, 24 have the same structure and are symmetrically arranged. The outer plates 22, 25 are simply situated outside the inner plates 23, 24.

The inner plates 23, 24 include beads 26 around the manifold holes 20 for the outer branches 15, and beads 27 around the manifold holes 20' for the inner branches 16. Since the inner plates 23, 24 are symmetrically formed, the explanation is made for the inner plate 23. The inner plate 24 has the same structure as in the inner plate 23.

The bead 26 formed on the inner plate 23 is formed of two flat side walls 26a and a top flat wall 26b to have a shape similar to a trapezoid. Also, the bead 27 is formed of two curved side walls 27a and a top curved wall 27b to have a shape similar to an arch. The width 26c of the bead 26 is the same throughout the entire length thereof, and also, the width 27c of the bead 27 is the same throughout the entire length thereof. Further, the width 26c is the same as the width 27c.

When the beads 26, 27 are compressed at the same pressure or torque, since the bead 26 has the trapezoidal shape, the bead 26 can be compressed easily more than the bead 27. Also, the surface pressure of the bead 26 in the trapezoidal shape is weaker than that of the bead 27.

In the present invention, all the bolts are tightened at the same torque by a torque wrench. Accordingly, when the bolts are tightened, the surface pressure at the bead 26 is weaker than that at the bead 27. Namely, the bead 26 can be compressed further or has extra compressibility after tightening more than the bead 27. Thus, when the manifold is deformed by heat, the bead 26 can absorb the deformation of the manifold more than the bead 27.

As explained before, the inner branch 16 is deformed less than the outer branch 15. Therefore, the bead 27 can seal the inner branch 16, while the beads 26 can seal the outer branches 15. In the invention, the deformation of the inner and outer branches can be properly absorbed by the beads 26, 27, and the manifold holes can be securely sealed.

Figure 6:
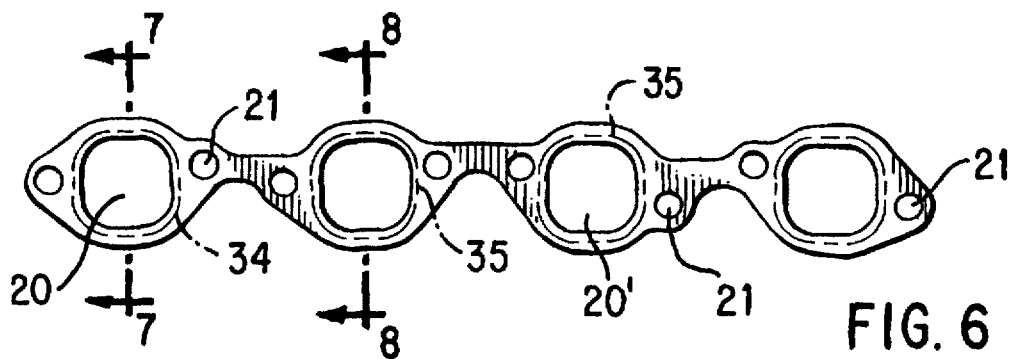
FIG. 6 is a plan view of a second embodiment of a manifold gasket of the invention.
Figure 7:
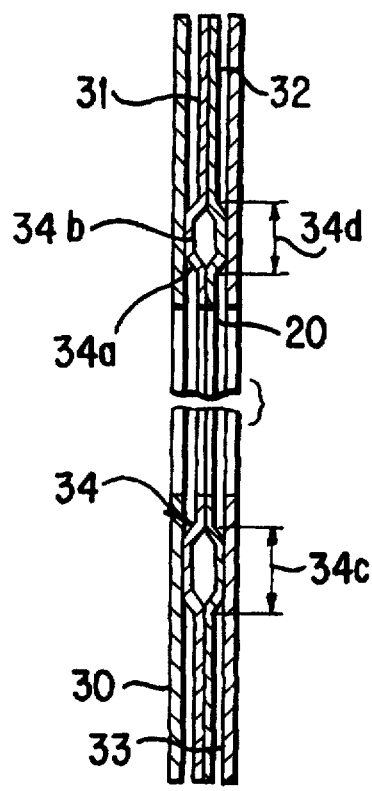
FIG. 7 is an enlarged sectional view taken along line 7—7 in FIG. 6.
Figure 8:
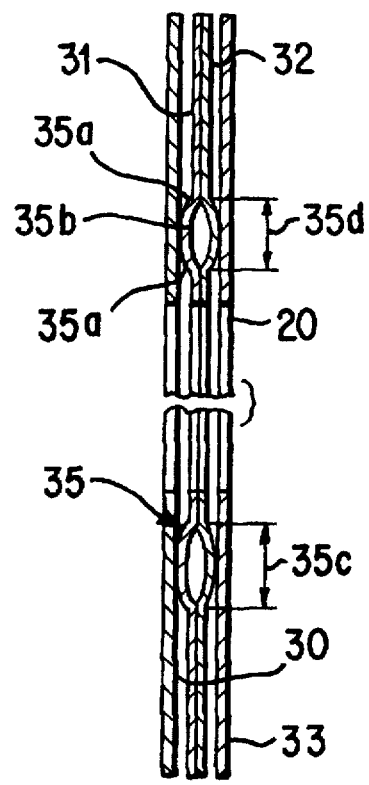
FIG. 8 is an enlarged sectional view taken along line 8—8 in FIG. 6.

FIGS. 6–8 show a second embodiment G' of a manifold gasket of the invention. The gasket G' is formed of outer plates 30, 33 and inner plates 31, 32 with beads 34, 35, as in the gasket G. Also, the bead 34 includes flat side walls 34a and a flat top wall 34b, and the bead 35 includes curved side walls 35a and a curved top wall 35b.

In the gasket G, the width 26c of the bead 26 and the width 27c of the bead 27 are the same and do not change throughout the entire length. However, in the gasket G', the width 34c of the bead 34 at one side is wider than the width 34d at the other side. Namely, when the gasket G' is installed, a side of the bead close to the end 11 (FIG. 2) is made wider than a side of the bead away from the end 11. Similarly, the width 35c of the bead 35 at a side close to the end 11 is made wider than the width 35d at the other side thereof.

The width 34c gradually changes to the width 34d, and the width 35c gradually changes to the width 35d. The widths 34c, 35c are the same, and the widths 34d, 35d are the same, respectively. The heights of the beads 34 and 35 are the same throughout the entire lengths thereof.

Since the lower sides of the beads, i.e. width 34c, 35c, are wider than the upper sides of the beads, i.e. width 34d, 35d, the lower sides of the beads can be compressed easily more than the upper sides of the beads.

Figure 2:
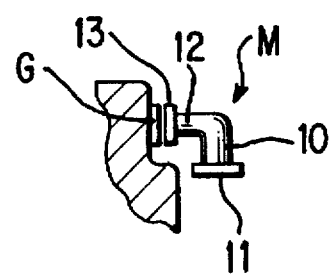
FIG. 2 is a side view of a structure as shown in FIG. 1.
Figure 3:
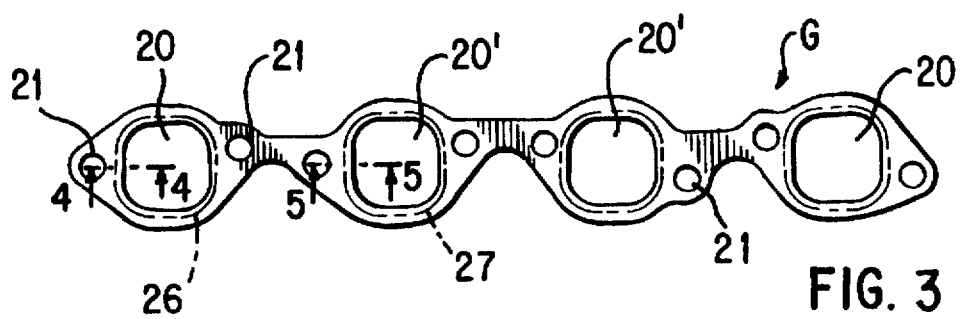
FIG. 3 is a plan view of a first embodiment of a manifold gasket of the invention.
Figure 4:
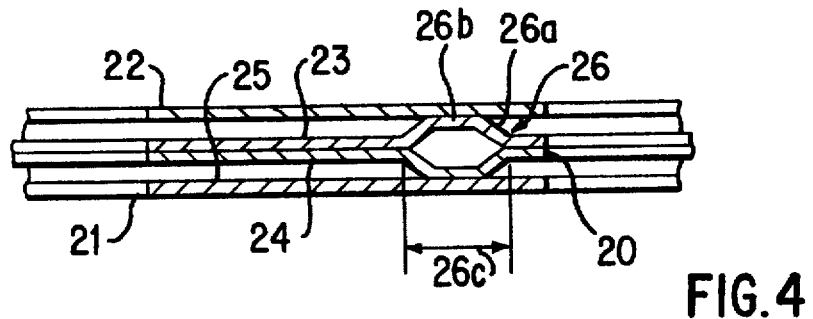
FIG. 4 is an enlarged sectional view taken along line 4—4 in FIG. 3.
Figure 5:
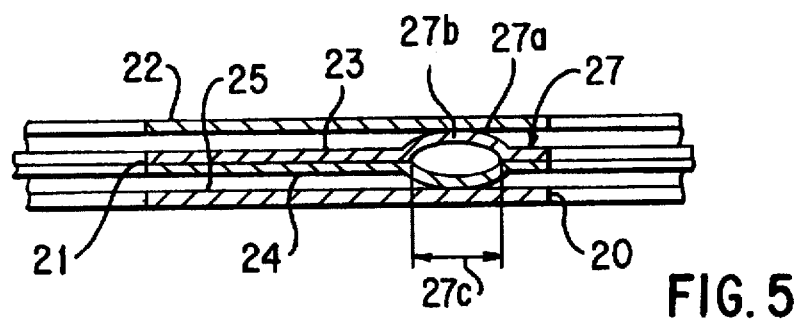
FIG. 5 is an enlarged sectional view taken along line 5—5 in FIG. 3.

As explained before, when the manifold M is deformed by heat, the flange 13 of the manifold M may slightly tilt its face upwardly or downwardly (FIG. 2). In this case, the lower side of the flange close to the end 11 provides pressure stronger than the upper side of the flange.

In the gasket G' of the invention, since the lower sides of the beads 34, 35 close to the end 11 where strong pressure is applied are made wider than the upper sides thereof, the lower sides of the beads 34, 35 can be compressed easily more than the upper sides. Therefore, when the flange of the manifold tilts upwardly or downwardly, the lower sides of the beads 34, 35 can absorb the pressure applied thereto. The rest of the structure and operation of the gasket G' is the same as those of the gasket G.

In the manifold gasket of the invention, the specific force applied to the manifold gasket from the manifold can be properly absorbed. The gasket can securely seal around the manifold holes.

While the invention has been explained with reference to the specific embodiments of the invention, the explanation is illustrative and the invention is limited only by the appended claims.

What is claimed is:

1. A manifold gasket for a manifold with at least three manifold holes arranged side by side, comprising:

a first metal plate for constituting the manifold gasket, said first metal plate having two outer holes and at least one inner hole situated between the two outer holes, said outer and inner holes corresponding to said at least three manifold holes, and a plurality of bolt holes for fixing the manifold gasket and the manifold, and two outer beads and at least one inner bead formed on the first metal plate, each one outer bead surrounding each outer hole and said at least one inner bead surrounding said at least one inner hole, each outer bead, when the manifold gasket is compressed with a predetermined constant torque, forming a surface pressure less than that of the at least one inner bead and providing compressibility more than that of the at least one inner bead upon receiving a further compression force so that when the manifold is heated, the outer beads are compressed to absorb deformation of the manifold to securely seal around the manifold holes.

2. A manifold gasket according to claim 1, wherein each outer bead has two inclined flat side walls and a flat top wall between the side walls similar to a trapezoidal shape in cross section, and the inner bead has two curved side walls and a curved top wall between the curved side walls similar to an arch shape in cross section, said outer and inner beads having same widths.

3. A manifold gasket according to claim 2, wherein the widths of the outer and inner beads are constant throughout entire lengths thereof.

4. A manifold gasket according to claim 3, further comprising a second metal plate having a structure as in the first metal plate, said outer and inner beads on the first metal plate being disposed on respective outer and inner beads on the second metal plate such that the outer and inner beads orient in opposite directions.

5. A manifold gasket according to claim 2, wherein each of the outer and inner beads has first and second sides facing each other, the width at the first side being greater than the width at the second side.

6. A manifold gasket according to claim 1, wherein said each of the outer beads has a shape different from that of the at least one inner bead to provide different surface pressures.

7. A manifold gasket for a manifold with at least three manifold holes arranged side by side, comprising:

a first metal plate for constituting the manifold gasket, said first metal plate having two outer holes and at least one inner hole situated between the two outer holes, said outer and inner holes corresponding to said at least three manifold holes, and a plurality of bolt holes for fixing the manifold gasket and the manifold, and two outer beads and at least one inner bead formed on the first metal plate, each one outer bead surrounding each of said outer holes and having two inclined flat side walls and a flat top wall between the side walls similar to a trapezoidal shape in cross section, said at least one inner bead surrounding said at least one inner hole and having two curved side walls and a curved top wall between the curved side walls similar to an arch shape in cross section, said outer and inner beads having same widths, each outer bead forming a surface pressure less than that of the at least one inner bead when the manifold gasket is compressed with a predetermined constant torque so that each of the outer beads has compressibility more than that of the at least one inner bead to absorb deformation of the manifold when it is heated and to securely seal around the manifold holes.

* * * * *